(12) United States Patent
Lipsky et al.

(10) Patent No.: US 7,747,872 B2
(45) Date of Patent: Jun. 29, 2010

(54) SECURE PORTABLE ELECTRONIC REFERENCE DEVICE

(75) Inventors: Barry J. Lipsky, Princeton, NJ (US); Kurt Goszyk, Washington Crossing, PA (US); Edward Skladany, Hopewell, NJ (US); Gregory Winsky, Medford, NJ (US); Duane Ellis, Medford, NJ (US); Jan Edler, Plainsboro, NJ (US)

(73) Assignee: Franklin Electronic Publishers, Inc., Burlington, NJ (US)

( * ) Notice: Subject to any disclaimer, the term of this patent is extended or adjusted under 35 U.S.C. 154(b) by 843 days.

(21) Appl. No.: 10/808,799

(22) Filed: Mar. 25, 2004

(65) Prior Publication Data

US 2005/0216755 A1 Sep. 29, 2005

(51) Int. Cl.
*G06F 11/30* (2006.01)
(52) U.S. Cl. .................. 713/193; 713/189; 380/270; 380/277; 707/9; 707/102
(58) Field of Classification Search .............. 713/193, 713/189, 168; 726/2, 27, 17; 709/217, 219, 709/248; 710/28; 380/277, 270; 705/1, 705/56, 14, 64, 57; 707/9, 102
See application file for complete search history.

(56) References Cited

U.S. PATENT DOCUMENTS

| | | | | |
|---|---|---|---|---|
| 5,638,444 A | * | 6/1997 | Chou et al. | 380/284 |
| 6,314,457 B1 | * | 11/2001 | Schena et al. | 709/219 |
| 6,708,182 B1 | * | 3/2004 | Kobayashi | 707/104.1 |
| 6,804,666 B2 | | 10/2004 | Morita | |
| 6,804,727 B1 | * | 10/2004 | Rademacher | 710/9 |
| 6,934,533 B2 | * | 8/2005 | Joyce et al. | 455/414.1 |
| 7,032,240 B1 | * | 4/2006 | Cronce et al. | 726/2 |
| 7,143,445 B1 | * | 11/2006 | Ishiguro et al. | 726/31 |
| 2002/0116271 A1 | * | 8/2002 | Mankoff | 705/14 |

FOREIGN PATENT DOCUMENTS

| | | |
|---|---|---|
| EP | 1058255 | 6/2000 |
| EP | 1 058 255 A2 | 12/2000 |
| EP | 1154404 | 11/2001 |
| WO | 00/68858 | 11/2000 |

OTHER PUBLICATIONS

Chinese Office Action dated Jan. 4, 2008.

* cited by examiner

*Primary Examiner*—Thanhnga B Truong
(74) *Attorney, Agent, or Firm*—Cowan, Liebowitz & Latman, P.C.

(57) ABSTRACT

An electronic reference device is disclosed that can be connected to an external computer. The electronic reference device functions as a dictionary for the reader to look up words as they read. It can also have various other functions that would be suitable for a portable electronic device. When connected to the computer, the system has sufficient security features to allow the user to copy databases between the devices and to still protect the digital rights of the databases in memory. The security features uses encryption techniques to tie the database to the location in memory to regulate the access and readability of the databases.

14 Claims, 5 Drawing Sheets

SECURE PORTABLE ELECTRONIC REFERENCE DEVICE

FIELD OF THE INVENTION

The invention relates to an electronic device that can be used as a reference guide by a person and more particularly to a device that can be connected to a computer to allow the computer to access the files located on an internal memory of the electronic device with adequate security to protect the digital rights of the content in the internal memory.

BACKGROUND OF THE INVENTION

Electronic devices can be programmed to function as electronic references. These electronic reference devices typically contain an extensive database pertaining to a particular subject. For example, the database could contain an English dictionary or a medical dictionary to allow a user to quickly lookup the definition of an unknown word or medical term. These devices are typically portable and self-contained. Accordingly, the database is pre-loaded onto internal memory contained within the device. The electronic reference devices usually have a keyboard to allow the user to access the data contained in the database and a screen to display that data to the user.

In addition to allowing the user to access the database, these devices can have additional software features to be used in conjunction with the reference database. Such software features can include creating annotations to entries in the database or creating word lists of particular words in the database. Additional software that is not related to the reference database can also be included. Software that maintains a contact list and a date book are two examples. The number and sophistication of these software features can be limited, due to the size of the portable device itself and the processing and memory limitations inherent in a handheld device. A personal computer ("PC") typically has a larger processor, larger display and more memory than the portable devices to enable a better usage of the database.

Universal Serial Bus ("USB") ports have become standard on PCs and laptop computers. Various external devices, such as memory devices, can be attached to a PC through the ("USB") port. In this way, the memory device can act as a removable mass storage device, and follows the USB Mass Storage Class specification, to provide data that can be used on the PC or laptop. However, these memory devices are recognized and treated by the PC as simply external memory. Consequently, they do not have any security features that will protect the digital rights of any material located on the memory.

The placement of a reference database in the memory of a portable device will often trigger concerns about protecting the digital rights of the database. These digital rights can be raised because the database is protected by a copyright. Typically, portable electronic reference devices have not implemented adequate security measures to protect these digital rights because these devices were self-contained devices without the capability of being connected to an external device, thereby eliminating the risk of unprotected copying.

In contrast, portable electronic devices that are capable of connecting to an external device also usually do not have adequate security measures because these devices typically carry information in its database that does not merit digital rights protection. For example, a Personal Digital Assistant ("PDA") will usually have a contact list or a calendar schedule stored in its internal memory. Although the PDA can be connected to a PC and the contact list or calendar schedule are capable of being copied, the information contained within those databases do not raise appreciable digital rights concerns.

SUMMARY OF THE INVENTION

In the invention, a portable device having a reference database resident in memory therein is capable of being connected to a PC or laptop. The portable device has a USB cable connector that hooks up to the PC or laptop via a simple USB cable or by placement in a USB cradle with cable. Because of USB hardware and software installed in the portable device, the PC treats the device as if it were a USB mass storage class device according to specifications developed by the USB Implementers Forum. An authorized reader software resident on the PC is used to access the reference database and other memory of the device. The reader software is installed in the PC, either by download from the internet or by upload from the handheld device itself. The internal memory in the portable device can be copied into RAM or temporary memory in the PC, and alternatively copied onto permanent memory (like a hard drive) in the PC. However, security features are implemented to protect the digital rights of the content of the reference database.

When the reference database is first loaded onto the internal memory of the device, the system uses a file system voucher system wherein the reference database is encrypted by a key that is derived from the file system serial number, which is a number assigned to the internal memory. For any subsequent loading of a database, the reference database is encrypted by using a Personal Identification Number ("PID") that is derived from the Device Serial Number, which is a number assigned to the Device. Both the file system and the PID method correlate the database with the physical device onto which it is stored. For either method, the reader software will have to validate the encrypted database against the appropriate encryption code before decrypting the database and accessing its contents. This ensures that only one useable copy of the data is authorized to be read unless another copy is authorized through purchase or a rights grant.

BRIEF DESCRIPTION OF THE DRAWINGS

The accompanying drawings are included to provide an understanding of the invention and constitute a part of the specification.

DETAILED DESCRIPTION OF THE INVENTION

Figure 1:
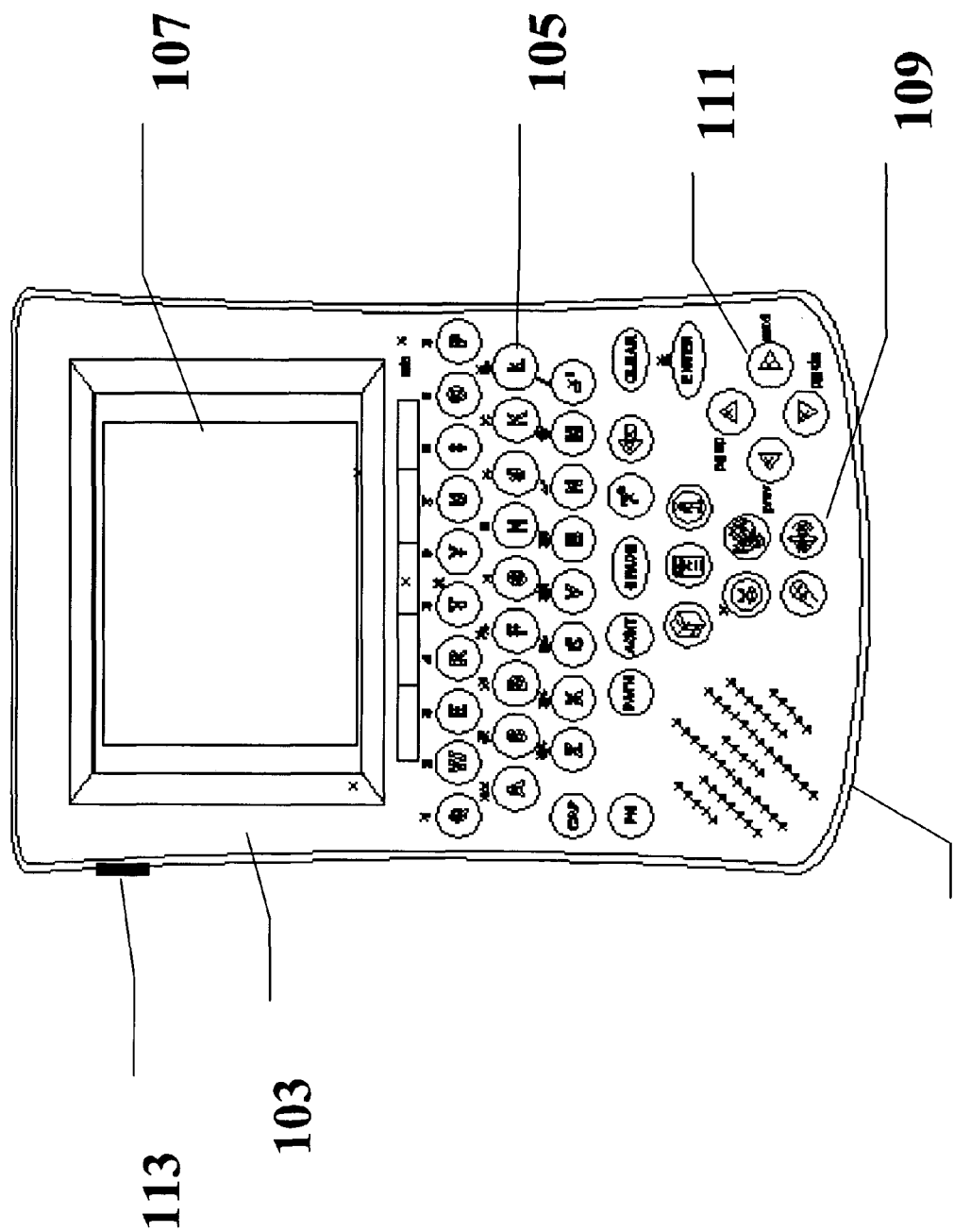
FIG. 1 depicts the front view of an apparatus that implements an embodiment of the present invention.

FIG. 1 depicts a layout of a portable device 101 that implements one embodiment of the present invention. Portable device 101 has a display section 103 and a keyboard section 105. The display section 103 has a screen 107 to display data to the user. In one embodiment of the present invention, the display screen is an LCD screen, but it can be any screen suitable to displaying graphics and/or text to the user.

Keyboard section 105 has the alphabet arranged in a QWERTY arrangement and allows the user to input data to the processor of the portable device 101. Directional arrow keys 111 and other miscellaneous keys 109 are located below the keyboard 105 that further aid the user to navigate the graphical user interface utilized by the device. Port 113 is located next to the screen 107 that allows connections to external devices.

Figure 2:
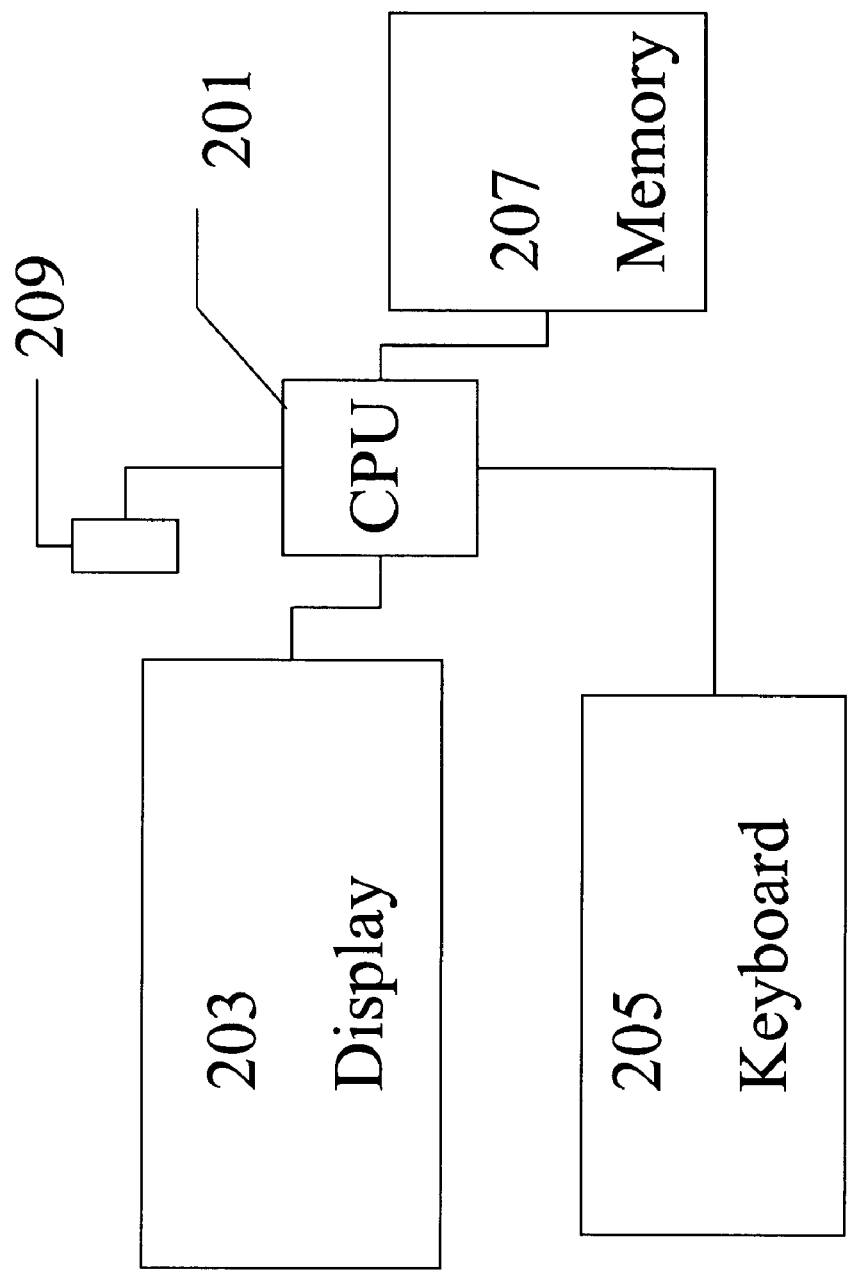
FIG. 2 depicts a schematic diagram of the components of an embodiment of the present invention.

FIG. 2 details a schematic diagram showing the electrical components of one embodiment of the portable device 101. Central processing unit 201 operates as the main control unit for the portable device. The processor 201 can be any microprocessor that is capable of being programmed to perform the various functions required by the device. Processing unit 201 is electrically connected to and controls the other circuits in the portable device.

One circuit connected to processor 201 is display circuit 203. The display circuit controls the screen used to provide information back to the user. Other circuits that would work in conjunction with the display circuit 203 to convey information back to the user, such as a sound unit, can be added to the device without changing the teachings of this invention Keyboard circuit 205 is electrically connected to main processor unit 201. Data input into the keyboard from the user is received and conveyed to the processor 201. Other means for inputting information to the processor can be utilized and be within the scope of this invention. The display circuit 203 and the keyboard circuit 205 can be combined if a touch screen were implemented Processor 201 is also electrically connected to memory unit 207. The memory unit acts as the main storage area for data, including the main database. The memory unit 207 can be comprised of memory chips that are permanently located within the apparatus. It can also include an external memory unit that is temporarily connected to the device.

External port 209 is also connected to the processor 201. External port 209 allows the portable device 101 to be electrically connected with an external device. External port 209 can be configured to be connected to a USB port or other suitable port to allow communications with an external device.

The processor 201 of the portable device 101 is programmed with the appropriate driver software to control and enable each of the above described circuits. In addition, processor 201 is also programmed with application software to allow the user to perform functions on the database in the device. The particular nature of the software will depend on the nature of the database stored in memory.

In the embodiment of the present invention where the database is an English language dictionary, the application software will have a graphical user interface to allow the user to enter a word to look up the definition. Upon typing the word using the keyboard and pressing the enter key, the device will display the definition of the word. If the word is misspelled, then the device will display a list of words that are the potential word. Additional features of this software will allow the user to type annotations for definitions and create word lists of particular words in the dictionary. These annotations and word lists are stored to the internal memory of the portable device. Additional application software can also be made available to the user such as a calendar program and a contact list manager program. These programs can personalize the electronic device to the user by storing this information in the internal memory.

These programs will be limited by the available memory on the portable device and the features of the portable device. In order to allow the user more flexibility and greater access to more powerful application software, the portable device is capable of being connected to a PC. Doing so allows the user to take advantage of the larger display, a more powerful processor and more extensive memory available on the PC.

Figure 3:
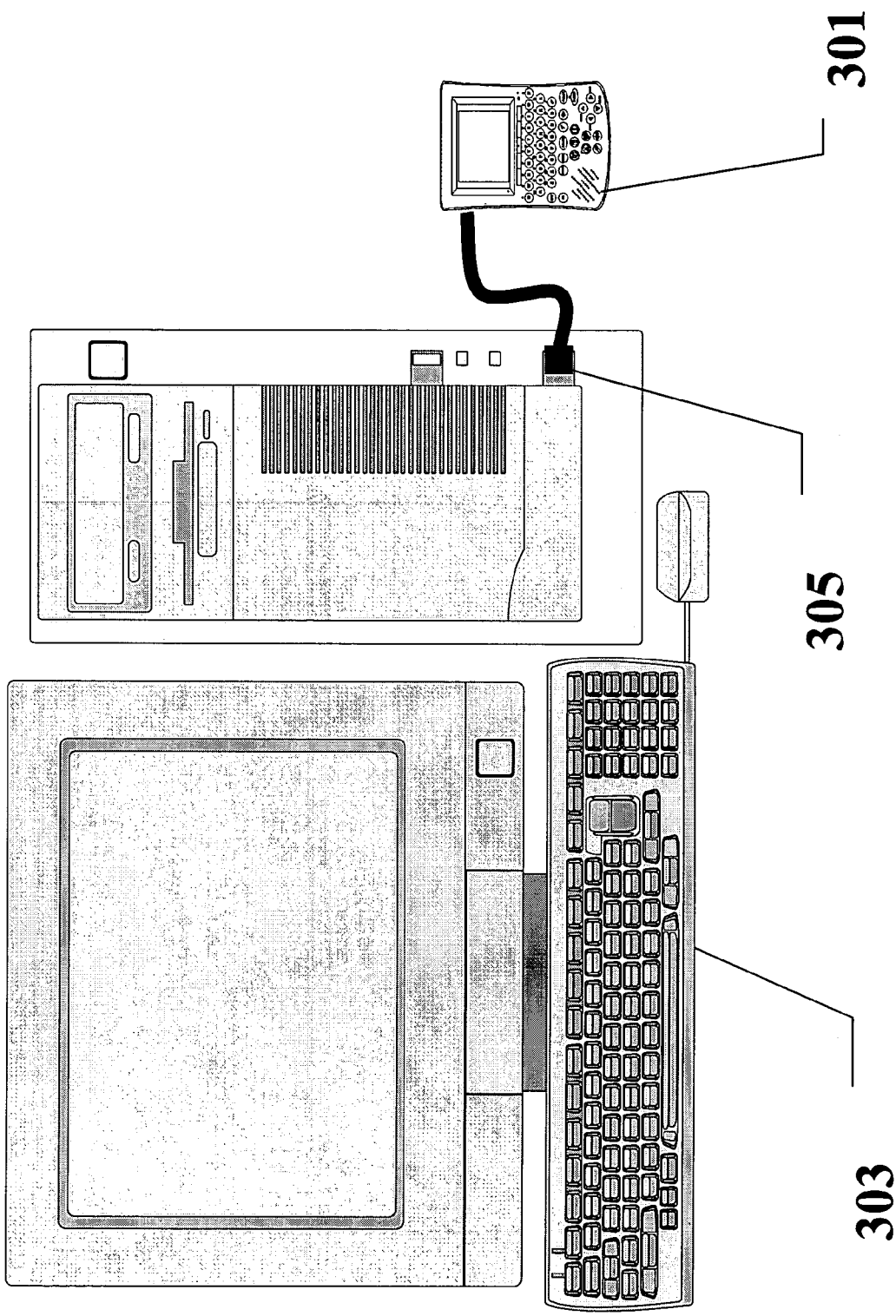
FIG. 3 depicts a front view of a system that implements an embodiment of the present invention.

FIG. 3 depicts one embodiment of the present invention where the portable device 301 is electrically connected to a PC 303. The portable device is connected to the PC through the USB port 305 on the PC. Other types of connection are possible and it would still be within the scope of the invention. However, using the USB port offers several advantages. The USB cable is thin (four wires) and carries enough power to be able to supply power to the portable device. Thus, the portable device can be powered by the PC and does not have to use its own battery.

In addition, the USB port also follows the USB convention for Mass Storage Class of devices and is readily recognized by popular operating systems, such as the Windows, Macintosh and Unix based operating systems. As such without requiring the user to install additional software drivers or other utility programs. Whenever a device is attached to the USB port, the PC senses voltage differences in the USB network and proceeds to query the device for type, vendor, functionality and bandwidth required. That device is assigned a unique drive letter and co-exists with all other USB devices and internal disk drives connected to the PC. Once the device is identified, the appropriate device driver is loaded by the operating system (O/S) and the user will be prompted for the driver disk if necessary. All configurations of devices is handled by the PC and by the software residing on the PC. There is no need to configure interrupt IRQs, addresses, or DMA channels.

When devices are detached (unplugged) from the USB network, the host computer detects the detachment, alerts the appropriate application and unmounts the drive letter. Other than plugging and unplugging the devices, there is no user intervention in configuring the devices.

Figure 4:
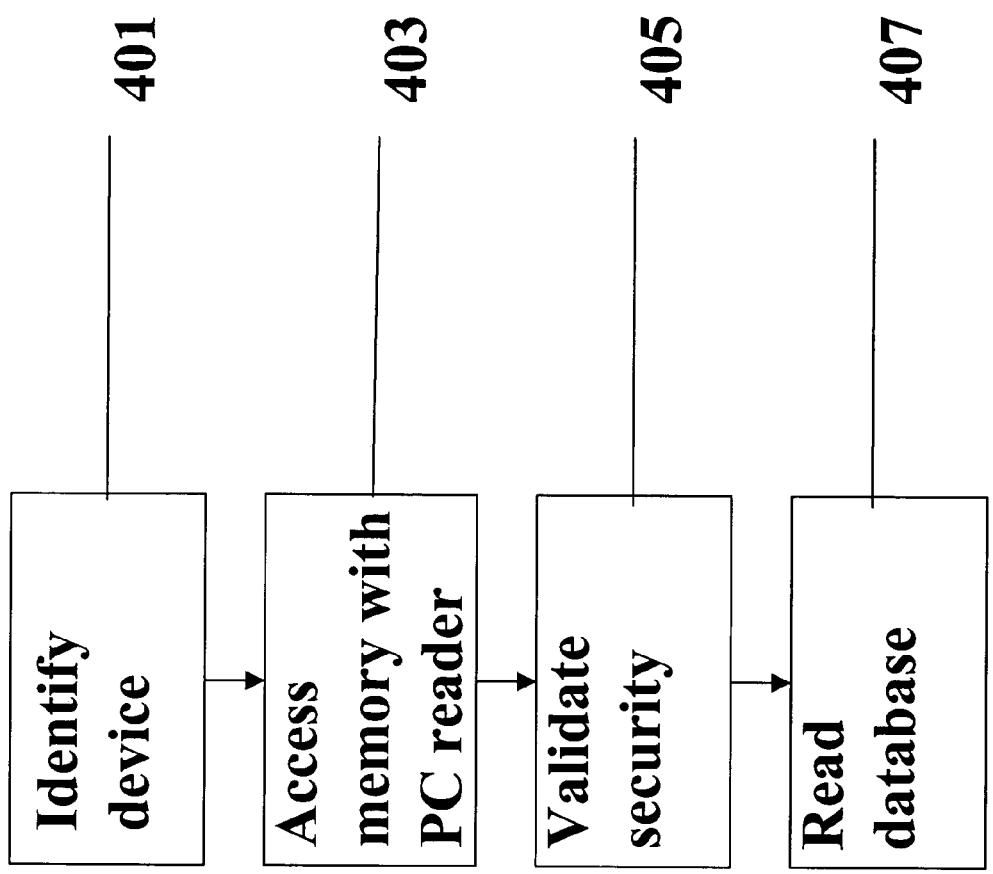
FIG. 4 depicts a flow chart showing the operation of one embodiment of the present invention.

Referring to FIG. 4, the operation of the system as the portable device is connected to the PC is detailed. Immediately upon connecting the portable device to the PC, the PC will detect the portable device and query it to identify itself in step 401. The portable device will identify itself as one or more mass storage devices depending on the presence of external or alternative memory devices attached to the device. Thus, the device can appear as three separate mass storage devices if appropriate external memory cards were inserted. No additional drivers are necessary to be loaded.

After the PC has recognized the portable device, the user can initiate a PC reader in step 403 that is capable of accessing the database resident on the portable device. The PC reader software can be identical to the software running on the portable device or it can be other authorized software that has been loaded onto the PC. When prompted by the user to access the database on the device, the PC reader will initiate a security validation process in step 405 prior to accessing the contents of the device. If the security validation process fails, the PC reader will not access the contents. If the security validation process succeeds, the PC reader will read the contents of the database in step 407. It will be appreciated that the security validation step 405 described in FIG. 4 can also be applied to authorized software resident in the device.

Figure 5:
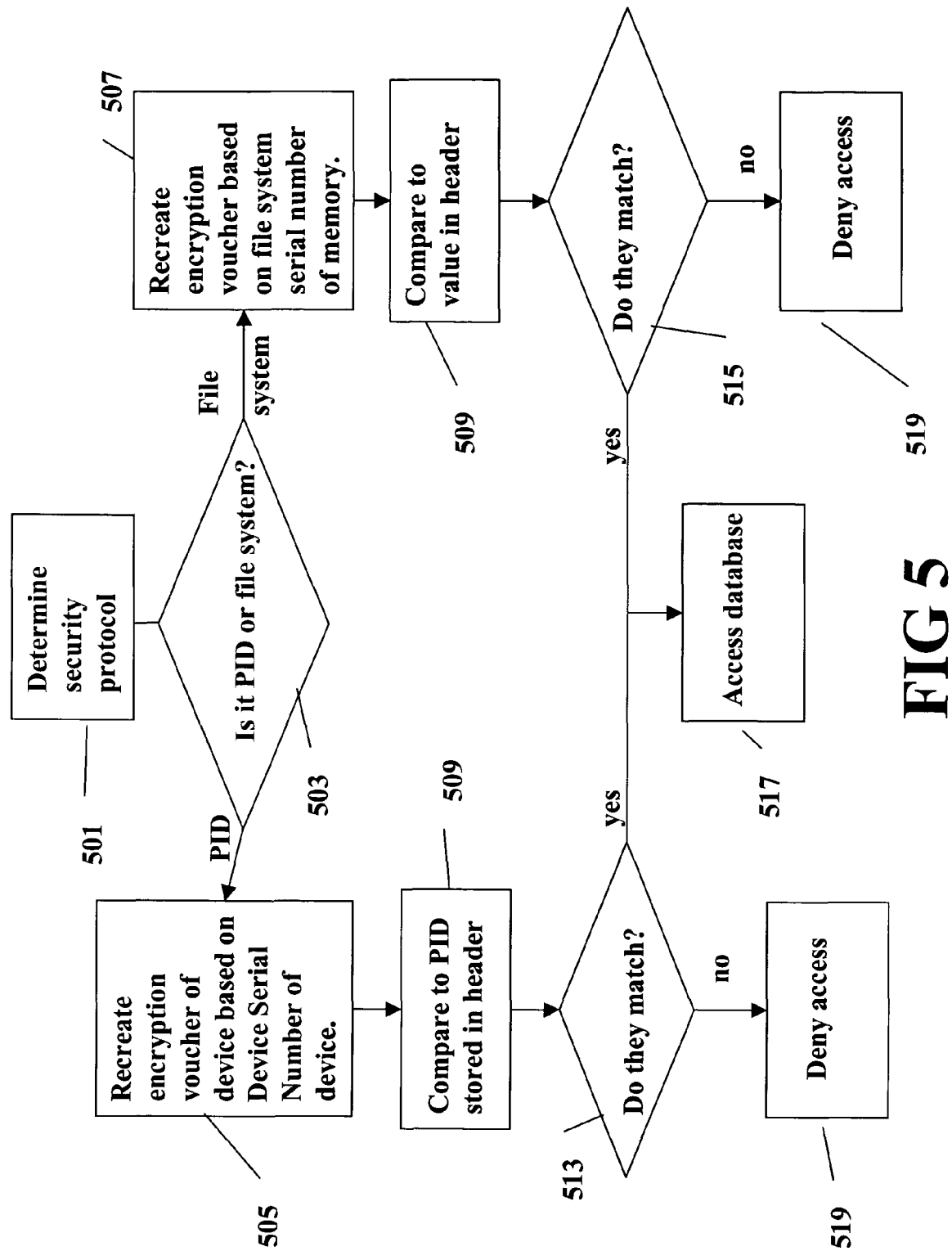
FIG. 5 depicts a flow chart showing the implementation of the security features to protect the digital rights of the content on the database in one embodiment of the present invention.

In FIG. 5, the steps of the security validation process for one embodiment of the invention are described. In step 501, the PC reader will first examine a header of the database to determine what security protocol has been implemented. In one embodiment of the present invention, the database uses two different protocols: a file system voucher and a PID voucher system.

In the file system voucher system, an encryption key voucher is generated through an algorithm and is based on a file system serial number. The file system serial number field is a number that is assigned to the physical memory of the database and is stored on the memory. The algorithm used can be any number of encryption key generating algorithms that are well known in the industry. The database is encrypted using that encryption key. In this manner, the database can be tied to the physical memory of the device.

In the PID voucher system, the PID is generated by using an algorithm based on the portable electronic device's Device Serial Number. The Device Serial Number is a unique number assigned to each device. Similar to the file system voucher, the algorithm used can be any type of encryption key generating algorithms that are well known in the industry. In one embodiment, the PID is generated using a mangling algorithm. The PID is used to encrypt the database, which ties the database to that particular device. In either security voucher system, the file system voucher or the PID is stored in the content header to the database. The content header is not encrypted.

After the reader software has identified the proper security protocol in step 503, the PC reader will recreate an encryption voucher based on the type of security protocol implemented. If the security protocol used the PID, then the PC reader will recreate the encryption voucher based on the PID of the device on which the database is stored in step 505. If the security protocol used the file system method, then the PC reader will recreate the encryption voucher based on the file system serial number in step 507. The encryption voucher is then compared against the encryption key stored in the header in step 509 or 511. If the two values match then the PC reader will have access to the database and will decrypt the database with the appropriate key. If the values do not match, then the PC reader is denied access.

The use of two different security features accommodates two different methods under which the database can be stored on the portable device. The database uses a file system voucher system for the initial database loaded onto the internal memory and a PID voucher system for any databases that have been updated or added to the internal memory.

When using a file system voucher system for the initial database to be loaded onto the internal memory, the same file system serial number can be designated to the memory for all devices carrying the same database. If a device carries a different database, then a different serial number must be assigned. The use of identical encryption vouchers for all devices having the same initial database reduces the amount of serial numbers that need to be tracked. In addition, even though using that uniformity results in the identical security encryption vouchers for all devices of the same type, the digital rights of that database are still adequately protected.

For example, if a user purchases an electronic reference device with a copyrighted database, then that user has the rights to use that database. The user can access it from the device itself or from the PC reader on a PC connected to the device. In either case, access of the database will not be blocked because the security voucher will match the encryption key since it properly resides in the right memory location.

If the user copies the database from one device to memory on a second device of the same type as the first device, then the user will still be able to access the copied database on the second device since the serial number will be the same. Although the database is located on a different memory location, access to that database will not violate the digital rights of the database because the user already has the right to use that particular database on the second device.

If, however, the user copies the database to a memory on a second portable device that is a different type of device than the first device, then the user will not be able to access the copied database on the second device because the serial number will be different and will not match the value in the header. The user will properly be blocked from accessing the copied database on the second device because the user does not have the digital rights to access that database on the second device; he only has the digital rights to access the database that was originally loaded on the second device. Thus, the digital rights of the first database is secured.

The use of a separate PID voucher system for any subsequent uploading or amendment of the database also ensures that the digital rights of the databases are adequately protected. The use of the PID takes advantage of the fact that each device is automatically assigned a unique serial number. Unlike the situation with the file system serial number, each subsequent uploading and/or amending of the database on a device will be unique to that particular device. Thus, each device cannot use the same security voucher similar to the file system voucher protocol.

When a user purchases a different database that will be uploaded to a portable device, the user must identify the PID for that device to the manufacturer. With the PID, the manufacturer of the reference will be able to encrypt the database accordingly and store the PID in the header of the database. Once the database and header is uploaded to the portable device, the user can only access that database if it is resident on that portable device. Any attempt to copy it to another device and access it from that device will fail since the stored PID will not match that device's PID.

If the user wishes to be able to store and view the database on a PC in addition to the portable device, the user can identify the PID of the PC to the manufacturer at the time of purchase. The manufacturer can then use one or both PIDs to encrypt the database for use on the PC as well as the portable device. This PID of the PC can be established upon installing the authorized reader software on the computer.

The same security measures can be implemented for any external memory that is added onto the portable reference device. In this manner, the initially loaded databases will be tied directly to the memory card by using the file system voucher system. Since the memory card can designed to be easily transferable between portable devices, the use of the file system voucher system allows for that portability and still protects the digital rights by tying the database to that memory card. If the user copies the database on the external memory card to the internal memory of the device or another external memory card, then the access will be denied since the file system voucher for the internal memory will not match the voucher stored in the header. Similarly, if the user copies the database on the internal memory of the device to the external memory, the access will also be denied.

The present invention is not to be considered limited in scope by the preferred embodiments described in the specification. Additional advantages and modifications, which readily occur to those skilled in the art from consideration and specification and practice of this invention are intended to be within the scope and spirit of the following claims:

We claim:

1. A security validation system adapted to employ a PC comprising:

a hand held electronic reference product, an encrypted database file and a file system on said hand held electronic reference product, a reader application adapted for installation on the PC, a serial identification number for one of said hand held product and said file system, a first voucher in said database file, said first voucher based on said serial identification number, and a second voucher in said product at a location outside of said database file, said second voucher based on said serial identification number, a comparator program within said PC reader to read and compare said first and second vouchers to provide a validation signal if said vouchers meet a predetermined correspondence comparison criterion, said validation signal permitting decryption by the PC of said database file wherein said database file is accessed using said file system of the hand held electronic reference product, precluding use of the file system on the PC, said database file being accessed while said hand held electronic reference product is connected to said PC and thereby said file system of said hand held electronic reference product maintaining control over the transmission of said database file.

2. The security validation of claim 1 wherein: said vouchers are based on a serial number in said file system.

3. The security validation of claim 1 wherein: said vouchers are based on a serial number of said hand held product.

4. The security validation of claim 1 wherein: said database file has a header and said first voucher is contained in said header.

5. The security validation of claim 2 wherein: said database file has a header and said first voucher is contained in said header.

6. The security validation of claim 3 wherein: said database file has a header and said first voucher is contained in said header.

7. The security validation of claim 1 wherein: said predetermined criterion is identity between said vouchers.

8. A security validation method of adapted to employ a PC comprising the steps of:

connecting the PC to a hand held electronic reference product having an encrypted database file and a file system, providing a serial number identification for at least one of said hand held product and said file system, providing a first voucher in said database file, said first voucher based on said serial number identification, providing a second voucher in said product at a location outside of said database file, said second voucher based on said serial number identification, comparing said first and second vouchers to determine correspondence in accordance with a predetermined criterion, and enabling decryption by said PC of said database file if said step of comparing meets said predetermined criterion, wherein said database file is accessed using said file system of the hand held electronic reference product, precluding use of the file system on the PC, said database file being accessed while said hand held electronic reference product is connected to said PC and thereby said file system of said hand held electronic reference product maintaining control over the transmission of said database file.

9. The security validation method of claim 8 wherein: said vouchers are based on a serial number in said file system.

10. The security validation method of claim 8 wherein: said vouchers are based on a serial number of said hand held product.

11. The security method of claim 8 wherein: said database file has a header and said first voucher is contained in said header.

12. The security validation method of claim 9 wherein: said database file has a header and said first voucher is contained in said header.

13. The security validation method of claim 10 wherein: said database file has a header and said first voucher is contained in said header.

14. The security validation method of claim 8 wherein: said predetermined criterion is identity between said vouchers.

* * * * *